(12) United States Patent
Lim

(10) Patent No.: US 9,650,077 B2
(45) Date of Patent: May 16, 2017

(54) CAR UNDERCOVER

(71) Applicant: Hanwha Advanced Materials Corporation, Seoul (KR)

(72) Inventor: Joung Myung Lim, Cheongju-si (KR)

(73) Assignee: Hanwha Advanced Materials Corporation, Seoul (KR)

( * ) Notice: Subject to any disclaimer, the term of this patent is extended or adjusted under 35 U.S.C. 154(b) by 11 days.

(21) Appl. No.: 14/714,053

(22) Filed: May 15, 2015

(65) Prior Publication Data

US 2015/0336615 A1    Nov. 26, 2015

(30) Foreign Application Priority Data

May 22, 2014  (KR) .................. 10-2014-0061719

(51) Int. Cl.
| | |
|---|---|
| *B62D 21/15* | (2006.01) |
| *B60R 21/34* | (2011.01) |
| *B62D 35/00* | (2006.01) |
| *B62D 35/02* | (2006.01) |

(52) U.S. Cl.
CPC ............ *B62D 21/155* (2013.01); *B60R 21/34* (2013.01); *B62D 35/005* (2013.01); *B62D 35/02* (2013.01)

(58) Field of Classification Search
CPC ... B60R 19/03; B60R 19/24; B60R 2019/247; B60R 21/34; B62D 21/155; B62D 35/005; B62D 35/02
USPC ........ 296/180.1, 187.09, 193.1, 193.09, 204; 293/120, 115, 102; 180/69.1
See application file for complete search history.

(56) References Cited

U.S. PATENT DOCUMENTS

| | | | | |
|---|---|---|---|---|
| 3,200,784 | A * | 8/1965 | Gowan, Sr. ............. | B63B 19/18 114/201 R |
| 5,692,796 | A * | 12/1997 | Yamamoto ........... | B62D 35/005 180/903 |
| 8,403,403 | B2 * | 3/2013 | Tashiro ................... | B60R 19/02 180/68.4 |

(Continued)

FOREIGN PATENT DOCUMENTS

FR    2859970    3/2005

OTHER PUBLICATIONS

European Search Report issued in European Application No. 15168144.2, Sep. 21, 2015, 6 pages.

*Primary Examiner* — Glenn Dayoan
*Assistant Examiner* — Sunsurraye Westbrook
(74) *Attorney, Agent, or Firm* — Lee, Hong, Degerman, Kang & Waimey

(57) ABSTRACT

A car undercover is provided. The car undercover includes: a cover main body installed on a lower end of a front frame carrier; a plurality of mount units formed by being spaced at a predetermined interval in a longitudinal direction on an end of the cover main body, in order to install the cover main body; and a reinforcement rib formed by being protruded in a vertically longitudinal direction on an internal side of the cover main body, in order to reinforce strength, wherein the reinforcement rib includes a stiffener formed by being protruded from the reinforcement rib in a shape opposite to a shape of the reinforcement rib. The car undercover may minimize damage of a pedestrian, by not being broken when colliding with the pedestrian. In addition, the car undercover may minimize damage of internal components, by being broken when colliding with a vehicle.

9 Claims, 4 Drawing Sheets

(56) References Cited

U.S. PATENT DOCUMENTS

| | | | |
|---|---|---|---|
| 8,746,782 B2* | 6/2014 | Naoi | B62D 25/10 |
| | | | 180/69.1 |
| 8,960,741 B2* | 2/2015 | Delwal | B05B 13/0285 |
| | | | 293/102 |
| 2002/0050413 A1* | 5/2002 | Renault | B62D 21/11 |
| | | | 180/69.1 |
| 2012/0153643 A1 | 6/2012 | Mana et al. | |
| 2012/0292123 A1* | 11/2012 | Morita | B62D 25/163 |
| | | | 180/69.1 |
| 2013/0026790 A1* | 1/2013 | Kakiuchi | B62D 35/02 |
| | | | 296/193.07 |
| 2013/0285416 A1* | 10/2013 | Fukushi | B62D 21/11 |
| | | | 296/204 |

* cited by examiner

SECTION C-C

CAR UNDERCOVER

Pursuant to 35 U.S.C. §119(a), this application claims the benefit of earlier filing date and right of priority to Korean Patent Application No(s). 10-2014-0061719, filed on May 22, 2014, the contents of which are all hereby incorporated by reference herein in its entirety.

BACKGROUND

Field of the Disclosure

The present disclosure relates to a car undercover.

Discussion of the Related Art

In general, an undercover of a vehicle performs functions to protect various components provided on a lower portion of a vehicle, to reduce air resistance during driving of the vehicle, and to block missiles from the road. Such undercover is installed on a cross member disposed on a lower portion of a front bumper, thereby protects engine and chassis components from protrusions on the ground, as well as smoothens air flow on a lower portion of the vehicle.

A number of references including Korean Patent No. 2005-0024653 and Korean Patent No. 2006-003423 are disclosed in relation to such undercover.

In particular, an FEM (Front End Module) is a vehicle front module integrating a front frame carrier, a radiator, a condenser, a heat exchanger such as intercooler, a fan and shroud, a headlamp and a bumper into a single unit.

Adopting such FEM enables an integrated design more efficient and lighter than a conventional vehicle body structure, thereby simplifies the process and enhances assembly workability, as well as contributes to maximize efficiency of heat exchanger by optimizing the structure of the heat changing unit.

However, the conventional undercover only includes a function to cover the lower portion of a vehicle, but lacks a protective function for pedestrians.

Furthermore, the conventional undercover, particularly the conventional FEM has an disadvantage of increasing damage rate of a vehicle body during an RCAR (Research Council for Automobile Repairs) collision test for simulating collision between vehicles, because the collision force is directly delivered to the front frame carrier so as to cause great damage to internal components.

SUMMARY OF THE DISCLOSURE

One of purposes of the present disclosure is to provide a car undercover which is not broken in order to minimize damage of a pedestrian when colliding with the pedestrian, otherwise, is broken in order to minimize damage of internal components when colliding with a vehicle.

In a general aspect of the present disclosure, there is provided a car undercover, comprising: a cover main body installed on a lower portion of a vehicle; a reinforcement rib formed by being upwardly protruded from the cover main body; a mount unit disposed on the reinforcement rib or on a longitudinal extension line of the reinforcement rib, by being provided in order to install the cover main body on the lower portion of the vehicle; and a stiffener disposed by being spaced from the mount unit, by being upwardly protruded from the reinforcement rib.

In some exemplary embodiments of the present disclosure, the stiffener may prevent breakage of the cover main body, when an impulse less than a predetermined impulse is applied to the cover main body.

In some exemplary embodiments of the present disclosure, a breakage may be induced at a portion of the cover main body corresponding to a portion between the stiffener and the mount unit, when an impulse equal to or more than a predetermined impulse is applied to the cover main body.

In some exemplary embodiments of the present disclosure, the cover main body may be roundly bent from a front towards a rear and may gradually be declined to a lower portion along a way to the rear.

In some exemplary embodiments of the present disclosure, the reinforcement rib may be extended in anteroposterior directions, and a plurality of the reinforcement ribs may be provided and disposed by being spaced in a widthwise direction of the vehicle.

In some exemplary embodiments of the present disclosure, the mount unit may be disposed at a rear end portion of the cover main body, and a plurality of the mount unit may be provided and disposed by being spaced in a widthwise direction of the vehicle.

In some exemplary embodiments of the present disclosure, the reinforcement rib may be extended in anteroposterior directions and is gradually declined to a lower portion along a way to a rear, the stiffener may be extended in anteroposterior directions and is gradually declined to a lower portion along a way to a front, and the mount unit may be disposed by being spaced from a rear of the stiffener.

In some exemplary embodiments of the present disclosure, a width of the stiffener may gradually become narrower along a way to an upper portion.

In some exemplary embodiments of the present disclosure, the reinforcement rib may be formed by a bending of the cover main body, and the stiffener may be formed as a single body with the reinforcement rib.

In another general aspect of the present disclosure, there is provided a car undercover, comprising: a cover main body installed on a lower end of a front frame carrier; a plurality of mount units formed by being spaced at a predetermined interval in a longitudinal direction on an end of the cover main body, in order to install the cover main body; and a reinforcement rib formed by being protruded in a vertically longitudinal direction on an internal side of the cover main body, in order to reinforce strength, wherein the reinforcement rib includes a stiffener formed by being protruded from the reinforcement rib in a shape opposite to a shape of the reinforcement rib.

In some exemplary embodiments of the present disclosure, a protruded height of the reinforcement rib may gradually become higher along a way to a front, and a protruded height of the stiffener gradually may become higher along a way to a rear.

In some exemplary embodiments of the present disclosure, a width of the stiffener may gradually become narrower along a way to an upper portion.

According to an exemplary embodiment of the present disclosure, the car undercover may minimize damage of a pedestrian, by not being broken when colliding with the pedestrian. In addition, the car undercover may minimize damage of internal components, by being broken when colliding with a vehicle.

DETAILED DESCRIPTION

Hereinafter, exemplary embodiments of the present disclosure will be described in detail with reference to the enclosed drawings.

Before describing exemplary embodiments of the present disclosure, it is to be certain that, the descriptions of particular structure or functions are intended only to describe exemplary embodiments according to a concept of the invention. Therefore, these exemplary embodiments according to a concept of the invention may have various modification, and should not be construed as limiting the invention to the illustrated exemplary embodiments described in the present disclosure.

In addition, various exemplary embodiments will be described more fully hereinafter with reference to the accompanying drawings, in which some exemplary embodiments are shown. the present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Figure 1:
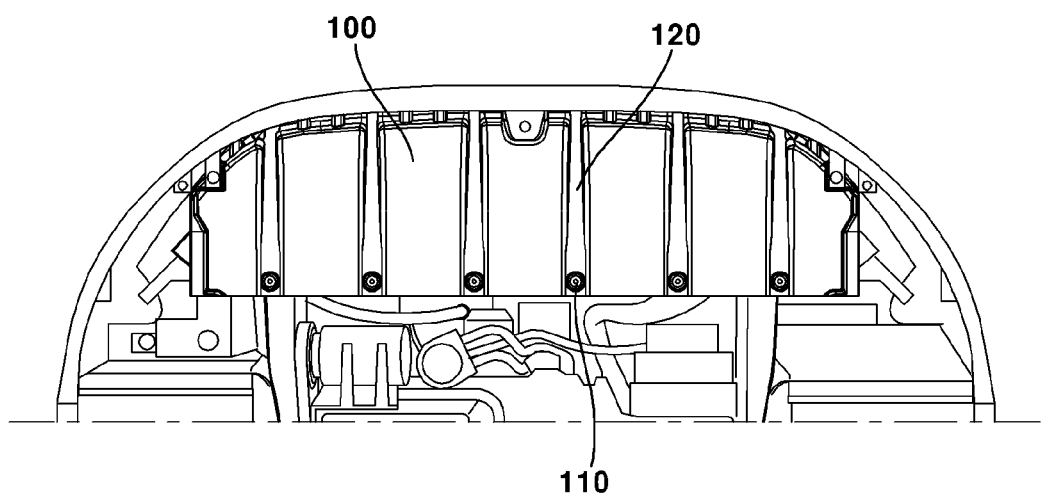
FIG. 1 is a bottom plan view illustrating a car undercover installed on a vehicle according to an exemplary embodiment of the present disclosure.
Figure 2:
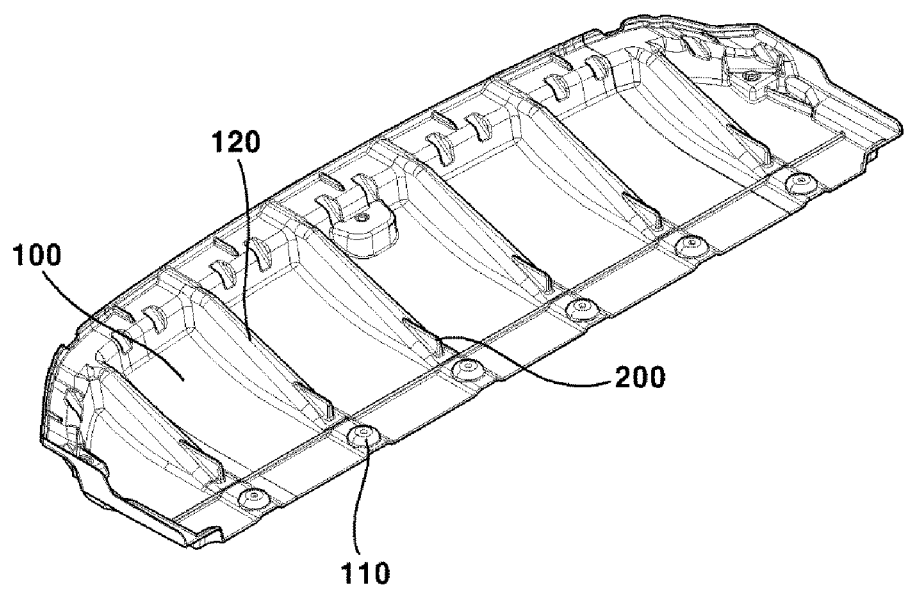
FIG. 2 is a perspective view illustrating a car undercover according to an exemplary embodiment of the present disclosure.
Figure 3A:
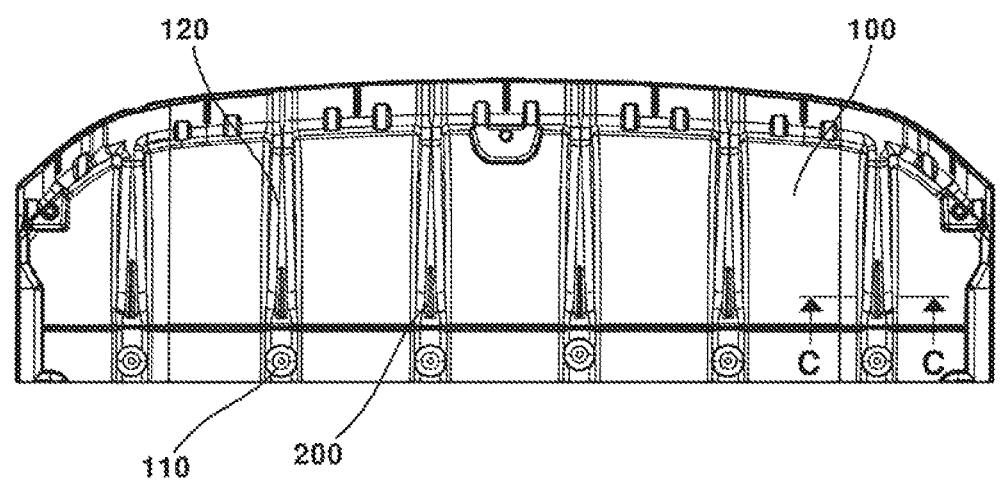
FIG. 3(a) is a plan view illustrating a car undercover according to an exemplary embodiment of the present disclosure.
Figure 3B:
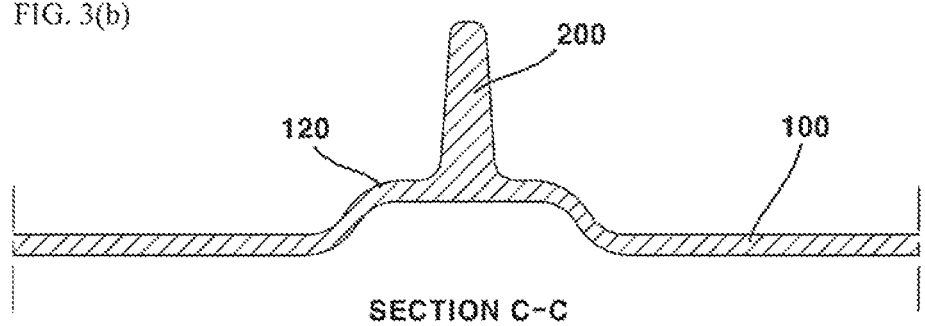
FIG. 3(b) is a sectional view in the direction of C-C line of FIG. 3(a).

As illustrated in FIGS. 1 to 3, a car undercover according to an exemplary embodiment of the present disclosure may include a cover main body (100).

The cover main body (100) may be installed on a lower portion of a vehicle. The cover main body (100) may be installed on a lower end of a front frame carrier which carries electronic units. The cover main body (100) may be roundly bent from a front (a direction where a vehicle moves forward, based on movement of the vehicle) towards a rear (a direction where a vehicle moves backward, based on movement of the vehicle) and may gradually be declined to a lower portion along a way to the rear.

A plurality of mount units (110) disposed by being spaced at a predetermined interval in a longitudinal direction may be provided on an end portion of the cover main body (110). The mount unit (110) may be provided in order to install the cover main body (100) on the lower portion of the vehicle. The mount unit (110) may be disposed on a reinforcement rib (120) or on a longitudinal extension line of the reinforcement rib (120). A plurality of the mount unit (110) may be provided and disposed by being spaced in a widthwise direction of the vehicle. The mount unit (110) may be in a shape of a boss capable of bolt coupling.

In addition, a reinforcement rib (120) formed by being protruded in a vertically longitudinal direction may be provided on an internal side of the cover main body, in order to reinforce strength. A plurality of the reinforcement ribs (120) may be provided and disposed by being spaced in a widthwise direction of the cover main body (100). The reinforcement rib (120) may be formed by being upwardly protruded from the cover main body (100). The reinforcement rib (120) may be extended in anteroposterior directions. A plurality of the reinforcement ribs (120) may be provided and disposed by being spaced in a widthwise direction of the vehicle. The reinforcement rib (120) may be formed by a bending of the cover main body (100).

A stiffener (200) may be formed as a single body with the reinforcement rib (120). The stiffener (200) may be formed by being upwardly protruded from the reinforcement rib (120). The stiffener (200) may disposed by being spaced from the mount unit (110). A width of the stiffener (200) may gradually become narrower along a way to an upper portion.

The reinforcement rib (120) may be extended in anteroposterior directions and may gradually be declined to a lower portion along a way to a rear. The stiffener (200) may be extended in anteroposterior directions and may gradually be declined to a lower portion along a way to a front. The mount unit (110) may disposed by being spaced from a rear of the stiffener (200).

According to an exemplary embodiment of the present disclosure, the stiffener (200) may prevent breakage of the cover main body (100), when an impulse less than a predetermined impulse is applied to the cover main body (100). That is, the stiffener (200) may enhance strength of the cover main body (100) when a comparatively less amount of impulse is applied to the cover main body (100). In other words, the stiffener (200) may reinforce strength of the cover main body (100) with respect to an impulse lower than 1 ton generated when the vehicle collides with a pedestrian, so as to prevent breakage of the cover main body (100). In such case, the damage impacted to legs of the pedestrian may be reduced, in comparison with a case where the cover main body (100) is broken.

Meanwhile, according to an exemplary embodiment of the present disclosure, a breakage may be induced at a portion of the cover main body corresponding to a portion between the stiffener (200) and the mount unit (110), when an impulse equal to or more than a predetermined impulse is applied to the cover main body (100). That is, the stiffener (200) may induce a breakage at a particular position in the cover main body (100) when a comparatively large amount of impact is applied to the cover main body (100). In other words, the stiffener (200) may induce a breakage in the cover main body (100) by providing a weak point with respect to an impulse when the vehicle collides with another vehicle. In such case, the damage impacted to internal components inside of the cover main body (100) may be minimized, in comparison with a case where the cover main body (100) is not broken.

The stiffener (200) according to an exemplary embodiment of the present disclosure may be formed by being protruded at a point where the reinforcement rib (120) is about to begin to be protruded from an internal side of the cover main body (100). Thereby, the stiffener may be formed so that a collision force delivered when an RCAR collision test is conducted can be blocked by the stiffener (200). That is, the collision energy is snapped and prevented from being directly delivered to the front frame carrier.

For the purpose of such effect, the stiffener (200) may be protruded in a shape opposite to a protrusion shape of the reinforcement rib (120).

That is, when referring to FIGS. 1 and 2, a protruded height of the reinforcement rib (120) may gradually become higher along a way to a front. However, a protruded height of the stiffener (200) according to an exemplary embodiment of the present disclosure may gradually become higher along a way to a rear, as an opposite shape of the reinforcement rib (120).

The reason of forming the reinforcement rib (120) and the stiffener (200) in such structure is, in order to match the lowest protruded portion of the reinforcement rib (120) with the lowest protruded portion of the stiffener (200) and to realize a significant difference in strength by the border of the matched point. Thereby, the collision energy can be concentrated to the lowest protruded portion, that is, to the weak point, and the weak point may be broken while being bent.

Therefore, the collision energy becomes rapidly extinct by the breakage, and is prevented from being delivered to the front frame carrier. Thereby, the internal components may be protected.

Furthermore, such effect of the present disclose may contribute to comply with the legal requirements for pedestrians. The bending of the cover main body (100) when the vehicle collides with a pedestrian may contribute to protect the pedestrians safely.

In particular, a side of the stiffener (200) may be designed as being variable, because the strength (stiffness) of the stiffener (200) may be controlled by modifying the side.

As illustrated in FIG. 3, for example, the side (width) of the stiffener (200) may gradually become narrower along a way to an upper portion.

Figure 4A:
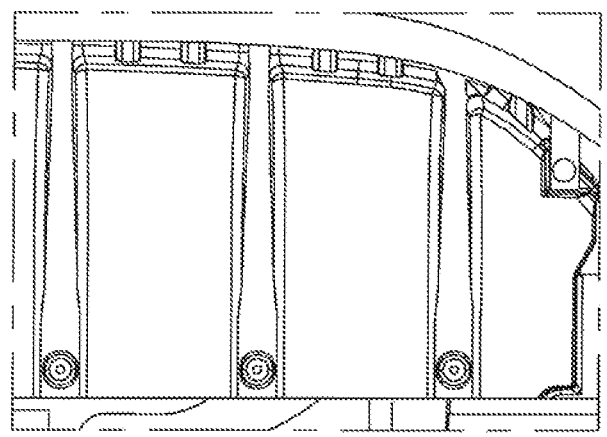
FIG. 4(a) is a bottom plan view illustrating a state of a car undercover according to an exemplary embodiment of the present disclosure installed on a vehicle before an RCAR (Research Council for Automobile Repairs) test.
Figure 4B:
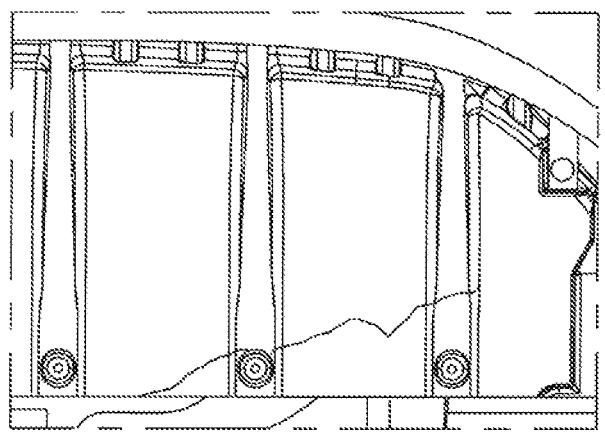
FIG. 4(b) is a bottom plan view illustrating a state of a car undercover according to an exemplary embodiment of the present disclosure installed on a vehicle after an RCAR (Research Council for Automobile Repairs) test.

FIG. 4 includes two bottom plan views illustrating a state of a car undercover according to an exemplary embodiment of the present disclosure installed on a vehicle before an RCAR (Research Council for Automobile Repairs) test (a), and after an RCAR (Research Council for Automobile Repairs) test (b), respectively.

Here, the RCAR test is a simulated vehicle collision test, which was conducted by striking the vehicle with a weight of 1.45 ton in a speed of 15 km/h. When comparing FIG. 4(*a*) to FIG. 4(*b*), it is shown that a breakage has been generated at a portion of the cover main body (100) corresponding to a portion between the stiffener (200) and the mount unit (100) by the RCAR test.

This is because the stiffener (200) induced the breakage in advance so as to prevent the collision energy from being delivered to the front frame carrier.

In addition, as a performance test for pedestrians, a horizontal center of the cover main body (100) is set as an OBL, and the decelerations and bend angles were tested at points spaced at particular intervals from the OBL, that is, eccentric points (100 bl, 225 BL, 410 BL, 450 BL, 550 BL). The result is as in the following TABLE 1, which shows an enhanced performance for pedestrians.

Here, BL means an extent of eccentricity (mm)

TABLE 1

| Division | | OBL | 100 BL | 225 BL | 410 BL | 450 BL | 550 BL |
|---|---|---|---|---|---|---|---|
| Standard | Deceleration | | | 150 G | | | |
| | Bend angle | | | Below 15° | | | |
| Conventional product | Deceleration | 123.1 | 148.9 | 140.4 | 150.4 | 139.5 | 155.6 |
| | Bend angle | 14.7° | 15.9° | 8.4° | 8.4° | 12.1° | 15.1° |
| The present disclosure | Deceleration | 120.4 | 122 | 119 | 111 | 102 | 91 |
| | Bend angle | 10° | 14.3° | 8.6° | 9.64° | 8.37° | 8.1° |

What is claimed is:

1. A car undercover comprising:
    a cover main body configured to be installed on a lower portion of a vehicle;
    a reinforcement rib protruded upwardly from the cover main body;
    a mount unit disposed on the reinforcement rib or on a longitudinal extension line of the reinforcement rib and configured to couple the cover main body to the lower portion of the vehicle; and
    a stiffener extended upwardly from the reinforcement rib,
    wherein the reinforcement rib, the mount unit and the stiffener are arranged linearly,
    wherein the stiffener is disposed at an inner portion of the cover main body and the mount unit is disposed at an outer portion of the cover main body such that the stiffener is spaced apart from the mount unit,
    wherein a length of the stiffener is shorter than a length of the reinforcement rib, and
    wherein a width of the stiffener is shorter than a width of the reinforcement rib.

2. The car undercover of claim 1, wherein the stiffener prevents breakage of the cover main body, when an impulse less than a predetermined impulse is applied to the cover main body.

3. The car undercover of claim 2, wherein a breakage is induced at a portion of the cover main body corresponding to a portion between the stiffener and the mount unit, when an impulse equal to or more than a predetermined impulse is applied to the cover main body.

4. The car undercover of claim 1, wherein the cover main body is roundly bent from a front towards a rear and is gradually declined to a lower side along a way to the rear.

5. The car undercover of claim 1, wherein the reinforcement rib is extended in anteroposterior directions, and
    a plurality of reinforcement ribs are provided such that each of the plurality of reinforcement ribs is spaced apart from another reinforcement rib in a widthwise direction of the vehicle.

6. The car undercover of claim 5, wherein the mount unit is disposed at a rear end portion of the cover main body, and
    a plurality of mount units are provided such that each of the plurality of mount units is spaced apart from another mount unit in the widthwise direction of the vehicle.

7. The car undercover of claim 1, wherein the reinforcement rib is extended in anteroposterior directions and is gradually declined to a lower side along a way to a rear,
    the stiffener is extended in anteroposterior directions and is gradually declined to a lower side along a way to a front, and
    the mount unit is disposed by being spaced apart from a rear of the stiffener.

8. The car undercover of claim 1, wherein the width of the stiffener gradually becomes narrower along a way to an upper side.

9. The car undercover of claim 1, wherein the reinforcement rib is formed by a bending of the cover main body, and
    the stiffener is integrally formed with the reinforcement rib.

* * * * *